United States Patent
Clark et al.

(10) Patent No.: US 9,442,918 B2
(45) Date of Patent: *Sep. 13, 2016

(54) PERSPECTIVE DATA MANAGEMENT FOR COMMON FEATURES OF MULTIPLE ITEMS

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,549

(22) Filed: Mar. 24, 2015

(65) Prior Publication Data

US 2016/0110399 A1    Apr. 21, 2016

Related U.S. Application Data

(63) Continuation of application No. 14/516,657, filed on Oct. 17, 2014.

(51) Int. Cl.
*G06F 17/27*    (2006.01)
*G06F 17/28*    (2006.01)
(Continued)

(52) U.S. Cl.
CPC ......... *G06F 17/2785* (2013.01); *G06F 17/271* (2013.01); *G06F 17/2705* (2013.01); *G06F 17/28* (2013.01); *G06F 17/30345* (2013.01); *G06F 17/30654* (2013.01);
(Continued)

(58) Field of Classification Search
CPC ... G06F 17/27; G06Q 30/02; G06Q 30/0282
USPC .............................................. 704/9; 705/347
See application file for complete search history.

(56) References Cited

U.S. PATENT DOCUMENTS

| 7,756,879 B2 | 7/2010 | Parsons et al. |
| 7,930,302 B2 * | 4/2011 | Bandaru .......... G06F 17/30864 707/737 |

(Continued)

OTHER PUBLICATIONS

Clark et al., "Perspective Data Management for Common Features of Multiple Items", U.S. Appl. No. 14/516,657, filed Oct. 17, 2014

(Continued)

*Primary Examiner* — Shaun Roberts
(74) *Attorney, Agent, or Firm* — Laura E. Gisler; Feb Cabrasawan

(57) ABSTRACT

A computer-implemented method of managing perspective data associated with a common feature in items is disclosed. The method can include identifying a common feature in a first item and a second item, the first item having a set of perspective data and establishing a subset of perspective data associated with the common feature. The method can include associating the subset of perspective with the second item. The method can include determining a set of relevancy scores for the subset of perspective data associated with the common feature and establishing a set of relevant perspective data from the subset of perspective data. The set of relevant perspective data can have relevancy scores outside of a relevancy threshold. The method can include associating the set of relevant perspective data with the second item.

6 Claims, 4 Drawing Sheets

(51) Int. Cl.
*G06F 17/30* (2006.01)
*G06Q 30/02* (2012.01)

(52) U.S. Cl.
CPC .. *G06F 17/30684* (2013.01); *G06F 17/30705* (2013.01); *G06Q 30/0282* (2013.01)

(56) References Cited

U.S. PATENT DOCUMENTS

| | | |
|---|---|---|
| 8,271,338 B2 | 9/2012 | Hunt et al. |
| 8,392,284 B2 | 3/2013 | Musgrove et al. |
| 8,620,906 B2 | 12/2013 | Shen et al. |
| 8,645,224 B2 | 2/2014 | Engle |
| 8,645,411 B1* | 2/2014 | Bandaru ............. G06F 17/3089 707/709 |
| 8,731,995 B2 | 5/2014 | Sun et al. |
| 9,223,831 B2* | 12/2015 | Baker ................ G06Q 30/0631 |
| 2005/0060643 A1* | 3/2005 | Glass .................... G06F 17/241 715/205 |
| 2008/0082499 A1* | 4/2008 | Koski ............... G06F 17/30719 |
| 2009/0150340 A1 | 6/2009 | Lhuillier et al. |
| 2010/0049590 A1* | 2/2010 | Anshul ............... G06F 17/2785 705/7.32 |
| 2012/0310771 A1 | 12/2012 | Selinger et al. |
| 2014/0019296 A1 | 1/2014 | Dillon et al. |
| 2014/0040160 A1* | 2/2014 | Comito ............. G06Q 30/0282 705/347 |
| 2014/0279196 A1 | 9/2014 | Wilson et al. |
| 2014/0310056 A1* | 10/2014 | Alapati ................. G06Q 50/01 705/7.28 |
| 2015/0095291 A1* | 4/2015 | Subramanya ......... G06Q 30/00 707/692 |

OTHER PUBLICATIONS

List of IBM Patents or Patent Applications Treated as Related.

* cited by examiner

PERSPECTIVE DATA MANAGEMENT FOR COMMON FEATURES OF MULTIPLE ITEMS

BACKGROUND

Aspects of the present disclosure relate to perspective data management, and more specifically, to incorporating perspective data associated with a common feature in a plurality of items.

When an item, such as a product, consumer good, service, or other similar item, is listed for sale on an e-commerce marketplace, ratings associated with the item (e.g. average number of stars for the item), in some instances, can be disproportionally affected by user reviews and other similar data. For example, where the item has a relatively small number of user views, subsequent user reviews will have a greater impact on an average rating for the item than for another item having a relatively large number of user reviews. Further, if an item is associated with relatively few user reviews, the lack of data can decrease a potential buyer's confidence in the accuracy of ratings associated with the item.

SUMMARY

According to embodiments of the present disclosure, a computer-implemented method of managing perspective data associated with a common feature in items is disclosed. The method can include identifying a common feature in a first item and a second item, the first item having a set of perspective data and establishing a subset of perspective data associated with the common feature. The method can include associating the subset of perspective with the second item. The method can also include determining a set of relevancy scores for the subset of perspective data associated with the common feature and establishing a set of relevant perspective data from the subset of perspective data. The set of relevant perspective data can have relevancy scores outside of a relevancy threshold. The method can include associating the set of relevant perspective data with the second item.

Embodiments of the present disclosure are directed towards a system for managing perspective data associated with a common feature in items. The system can include a natural language processing (NLP) unit and a logic device. The NLP unit can be configured to identify a common feature in a first item and a second item, the first item having a set of perspective data. The NLP unit can be configured to establish a subset of perspective data associated with the common feature and determine a set of relevancy scores for the subset of perspective data associated with the common feature. The logic device can be configured to associate the subset of perspective with the second item. The NLP unit can be configured to establish a set of relevant perspective data from the subset of perspective data, the set of relevant perspective data having relevancy scores outside of a relevancy threshold. The logic device can be configured to associate the set of relevant perspective data with the second item.

Embodiments of the present disclosure are directed towards a computer program product for managing perspective data associated with a common feature in items. The computer program product including a computer readable storage medium having program instructions embodied therewith. The program instructions can be executable by a computer to cause the computer to perform a method. The method can include identifying a common feature in a first item and a second item, the first item having a set of perspective data and establishing a subset of perspective data associated with the common feature. The method can include associating the subset of perspective with the second item. The method can include determining a set of relevancy scores for the subset of perspective data associated with the common feature and establishing a set of relevant perspective data from the subset of perspective data. The set of relevant perspective data can have relevancy scores outside of a relevancy threshold. The method can include associating the set of relevant perspective data with the second item.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
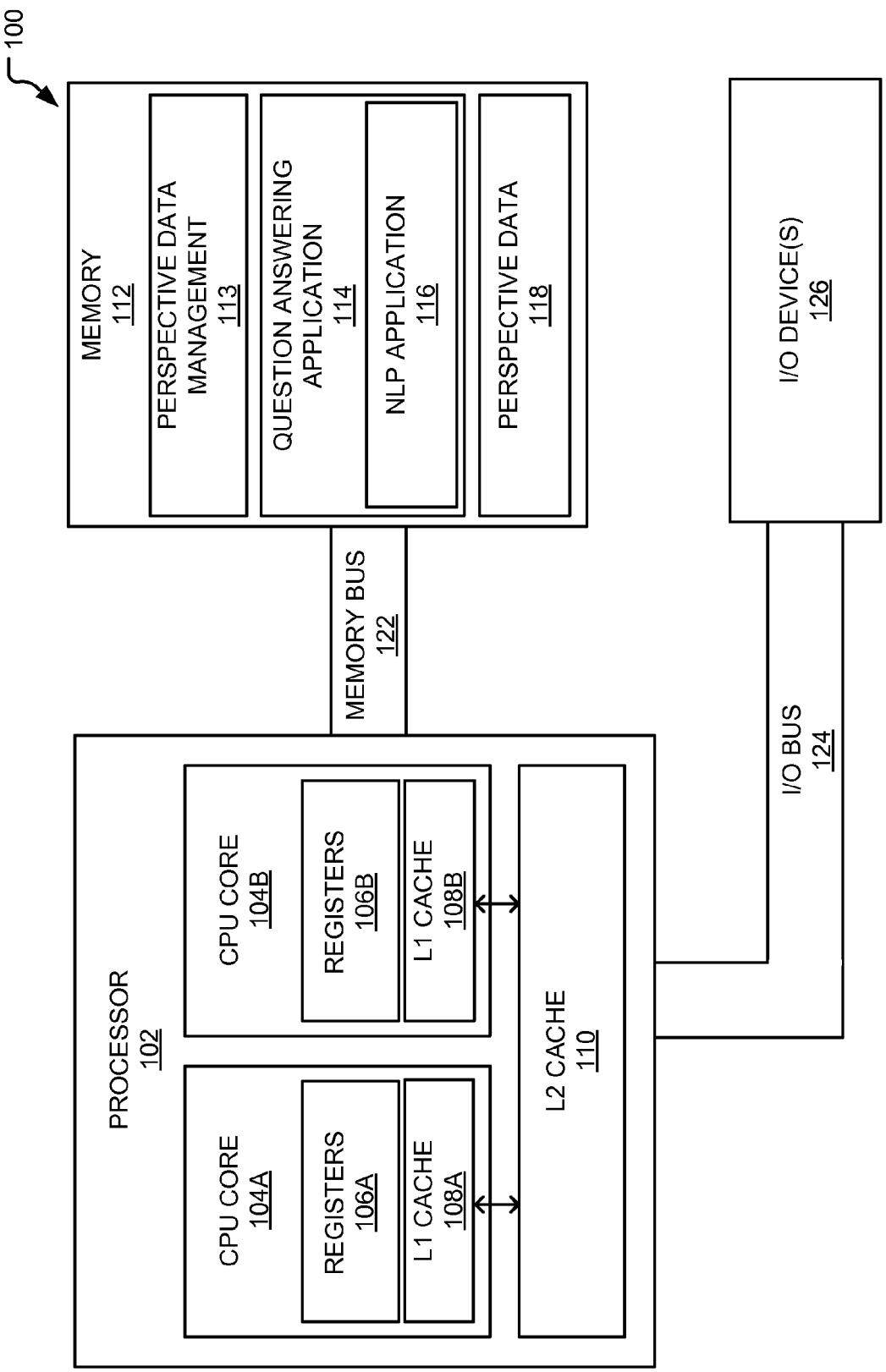
FIG. 1 depicts a system for perspective data management, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to perspective data management, more particular aspects relate to incorporating perspective data associated with a common feature in a plurality of items. While the present disclosure is not necessarily limited to such applications, various aspects of the disclosure may be appreciated through a discussion of various examples using this context.

While various numbers may be used to identify same named elements within disclosure, this practice is not intended to limit the scope of the disclosure. Identified elements in one figure may be the same or substantially similar to other same named elements in other figures.

Embodiments of the present disclosure are directed towards a system of perspective data management. An item, such as a consumer good, product, service, event, location or other similar item can be associated with perspective data to provide prior opinions, experiences, or other perspectives regarding the item. For example, the item could be a good or service which is listed on an e-commerce marketplace. Perspective data could be associated with the good or service to provide information to users about the good or service prior to purchase. In certain examples, the item could be a weekly concert. Perspective data could be associated with the concert to provide information about the concert to users before they attend the event.

In embodiments, perspective data could include, but is not limited to, one or more text descriptions of the item. In certain embodiments, perspective data could include one or more rating parameters. The one or more rating parameters can include, for example, user ratings (e.g. a number of stars for the item), a percentage of users who had a positive experience with the item, or other similar parameters. In embodiments, perspective data can be created by various users. The perspective data can then be provided to other users to give an impression of user experiences with the item. That impression can be useful as information which can assist in the decision of whether to purchase, visit, use, or otherwise interact with the item.

In some instances, an item can be associated with a set of perspective data. In embodiments, the set of perspective data can be relatively small. In such instances, the set of perspective data can be disproportionally affected by additional perspective data which is added to the set. For example, where the perspective data includes an average rating based on one or more individual user ratings, a single additional user rating will have a lesser effect on the average rating where the item has ten thousand previous user ratings than where the item has five previous user ratings. Further, users could have decreased confidence in the accuracy of the relatively small set of perspective data. For example, a user could have greater confidence in a set of perspective data including an average rating of four out of five stars, when the average rating is generated from ten thousand previous user ratings than when the average rating is generated from only five previous user ratings.

In some instances, the item could share one or more common features with another item. For example, a first item and a second item could each be a different kind of smart phone which share one or more similar components. For example, the one or more similar components could include the type of glass used in the screen, the processor in the smart phone, and the type of battery used. In certain examples, the first and second items could share other features such as the same provider, the same operating system, or other features.

Perspective data related to the common features could be incorporated between the first and second items. For example, perspective data associated with the first item, which is related to the type of glass used in the screen or related to other common features between the first and second items, could be incorporated to become perspective data associated with the second item. Thus, the size of a set of perspective data associated with the second item could be increased and potential buyers could have increased confidence in the perspective data.

In embodiments, the system of perspective data management can be configured to identify a common feature in a first item and a second item. As described herein, the first item and second item can be various types of items. For example, the item could be a good (e.g. electronics, clothing, or food), a service (e.g. repair service, cleaning service, or child-sitting), event (e.g. concert, parade, or fair), location (state park, or monument), or other similar item. In embodiments, features can be various characteristics of the item. For example, features could include components in an item, the provider or manufacturer of the item, management in charge of the item (where, for example, the item is a service), the offeror of the item, and other similar features.

Described further herein, the system can utilize natural language processing (NLP) techniques to identify features in the items. Features can identified by various techniques. In embodiments, description data can be associated with the first and second items. Description data can include text, tags, or other indicators which describe features of the item. For example, the description data could be a text listing components included in the item. In certain examples, such as where items are listed in an e-commerce marketplace, description data could be included with each listed item. In embodiments, the system can parse the description data associated with the first and second items to identify components in the items, the provider of the items, and other features as described herein. In certain embodiments, a product description can be parsed using NLP techniques to identify semantically significant words, such as words having a high-IDF (inverse document frequency) score, repeated throughout description, or trademarked.

In embodiments, the system can determine whether identified features are common features. In embodiments, Feature commonality can be determined by concept matching techniques. Concept matching techniques could include, but is not limited to, semantic similarity, and ontological matching. In embodiments, ontological could be used to map each particular feature in an item to a concept. For example, the system could be configured to map a first feature from the first item to a concept (i.e. model number, item number, etc). The system could do the same with a second feature from the second item, and then determine whether the concept identifiers are substantially similar.

In certain embodiments, if the concept identifiers are substantially similar, the identified features are common features. In certain embodiments, if the concept identifiers are the same, the identified features are common features. For example, where the first and second items are tablet computers, each could have a processor chip from a first provider. The processor chips could be substantially similar if they share the same model number. In certain examples, the first and second items could each have memory from different providers. The memory in the first and second items could be substantially similar if they share the same capacity and/or memory clock speeds.

In embodiments, the first item can be associated with a set of perspective data. As described herein, perspective data could include one or more text descriptions of user perspectives on the first item, and one or more rating parameters. For example, the first item could have a set of perspective data including one thousand text descriptions from users along with one thousand rating parameters, such as a number of stars given to the item out of a total of five stars.

In embodiments, the system can be configured to establish a subset of perspective data associated with the common feature. In embodiments, the system can use NLP techniques to parse the set of perspective data associated with the first item to identify perspective data which is related to the common features. In embodiments, perspective data could be logically segmented to natural boundaries (i.e. sentences, paragraph, section, etc.) and evaluated for a LAT (Lexical Answer Type) and/or core focus of that segment. The LAT and/or focus could be used to determine whether a segment was associated with the common feature. For example, where the common feature is the processor in the item, the system could analyze text reviews of the first item to identify one or more text reviews which discuss the processor. The system can then establish a subset of the perspective data which includes perspective data related to the common features.

In embodiments, the system can be configured to determine a set of relevancy scores for the subset of perspective data. Relevancy scores can be applied to the subset of perspective data to filter out certain perspective data associated with the common feature but which does not meet a threshold of relevancy to be incorporated with perspective data associated with the second item. The relevancy scores can be calculated based on various factors. In embodiments the relevancy score can be calculated based on perspective data metadata. Perspective data metadata can include data about the perspective data. For example, perspective data metadata could include the length of a text description, whether the perspective data originated from a verified user of the item, the number of users which found the perspective data helpful, the origin of the perspective data, or other similar data.

In embodiments, the system can be configured to establish a set of relevant perspective data from the subset of perspective data. Described further herein, the set of relevant perspective data can established from the subset of perspective data having relevancy scores outside of a relevancy threshold. In embodiments, the system can be configured to associate the set of relevant perspective data with the second item.

Referring now to FIG. 1, a system 100 for perspective data management can be seen according to embodiments of the present disclosure. In embodiments, the system 100 can include a processor 102, memory 112, and I/O (input/output) devices 126.

The processor 102 can execute instructions stored in memory 112 and perform various functions in the computer processing system 100. The processor 102 can include CPU cores 104A, 104B. In embodiments, the processor 102 can contain a plurality of CPU cores. In certain embodiments, the processor 102 can contain a single CPU core. Each of the CPU cores 104A, 104B can include registers 106A, 106B, and L1 cache 108A, 108B. The CPU cores 104A, 104B can retrieve and execute instructions from memory 112 and provide logic functions for the processor 102. The registers 106A, 106B and L1 cache 108A, 108B can provide storage for data that frequently accessed in each CPU core 104A, 104B. The processor 102 can also include L2 cache 110. The L2 cache 110 can be communicatively connected to each of the CPU cores 104A, 104B and can provide shared storage for data in the processor 102.

In embodiments, the system 100 can contain multiple processors 102 typical of a relatively large system. In certain embodiments, the computer system 100 can be a single processor system. The processor 102 can be various types of processors including, but not limited to digital signal processor (DSP) hardware, network processor, application specific integrated circuit (ASIC), field programmable gate array (FPGA), or other types of processors. The memory 112 can be coupled to the processor 102 via a memory bus 122.

The memory 112 can include a random-access semiconductor memory, storage device, or storage medium (either volatile or non-volatile) for storing or encoding data and programs. The memory 112 can be conceptually a single monolithic entity, but in other embodiments the memory 112 can be a more complex arrangement, such as a hierarchy of caches and other memory devices. The memory 112 can store data, instructions, modules, and other types of information, hereafter collectively referred to as "memory elements." Although the memory elements are illustrated as being contained within the memory 112, in certain embodiments some or all of them can be on different devices and can be accessed remotely, e.g., via a network.

The system 100 can use virtual addressing mechanisms that allow the programs of the computer system 100 to behave as if they only have access to a large, single storage entity instead of access to multiple, smaller storage entities. Thus, while the memory elements are illustrated as being contained within the memory 112, these elements are not necessarily completely contained in the same storage device at the same time. Further, although the memory elements are illustrated as being separate entities, in other embodiments some of them, portions of some of them, or all of them can be packaged together.

In embodiments, the memory elements can include a perspective data management application 113, and a question answering application 114 having an NLP application 116. The memory elements can also include perspective data 118. In embodiments, the perspective data management application 113 can instruct the system 100 to perform embodiments of the present disclosure, as described herein. In certain embodiments, the perspective data management application 113 can use the question answering application 114 to perform embodiments of the present disclosure.

For example, in embodiments, the question answering application 114 could receive one or more questions and construct answers by querying a structured or unstructured body of data. In embodiments, the NLP application 116 can be used to evaluate questions posed in natural language format. In embodiments, the NLP application 116 can also be used to analyze/search the structured or unstructured body of data to construct an answer to questions. In embodiments, the question answering application 114 can then extract, from the body of data, one or more candidate answers to the question. In embodiments, the candidate answers can be scored and ranked by the question answering application 114 to produce a ranked list of answers with associated confidence values.

In embodiments, the question answering application 114 could receive a question asking to identify any common features shared between a first item and a second item. The NLP application 116 could be used to understand the question posed. Further, the question answering application 114 could use the NLP application 116 to parse description data associated with the first and second item to identify common features. The NLP application 116 could be used to parse perspective data 118 associated with the first item to identify a subset of perspective data 118 associated with the common features. The perspective data 118 can be the same or substantially similar as described herein. In embodiments, the perspective data 118 can be structured or unstructured data serving as a body of data for the question answering application 114.

The processor 102 can also communicate with one or more I/O devices 126 via an I/O bus 124. The I/O devices 126 can include, but are not limited to, devices such as a keyboard, a pointing device, a display, one or more devices that enable a user to interact with the computer system 100, and various devices (e.g., network interface card, modem, etc.) that enable the computer system 100 to communicate with one or more other computing devices. It should be understood that other suitable hardware and software components can be used in conjunction with the computer system 100.

Figure 2:
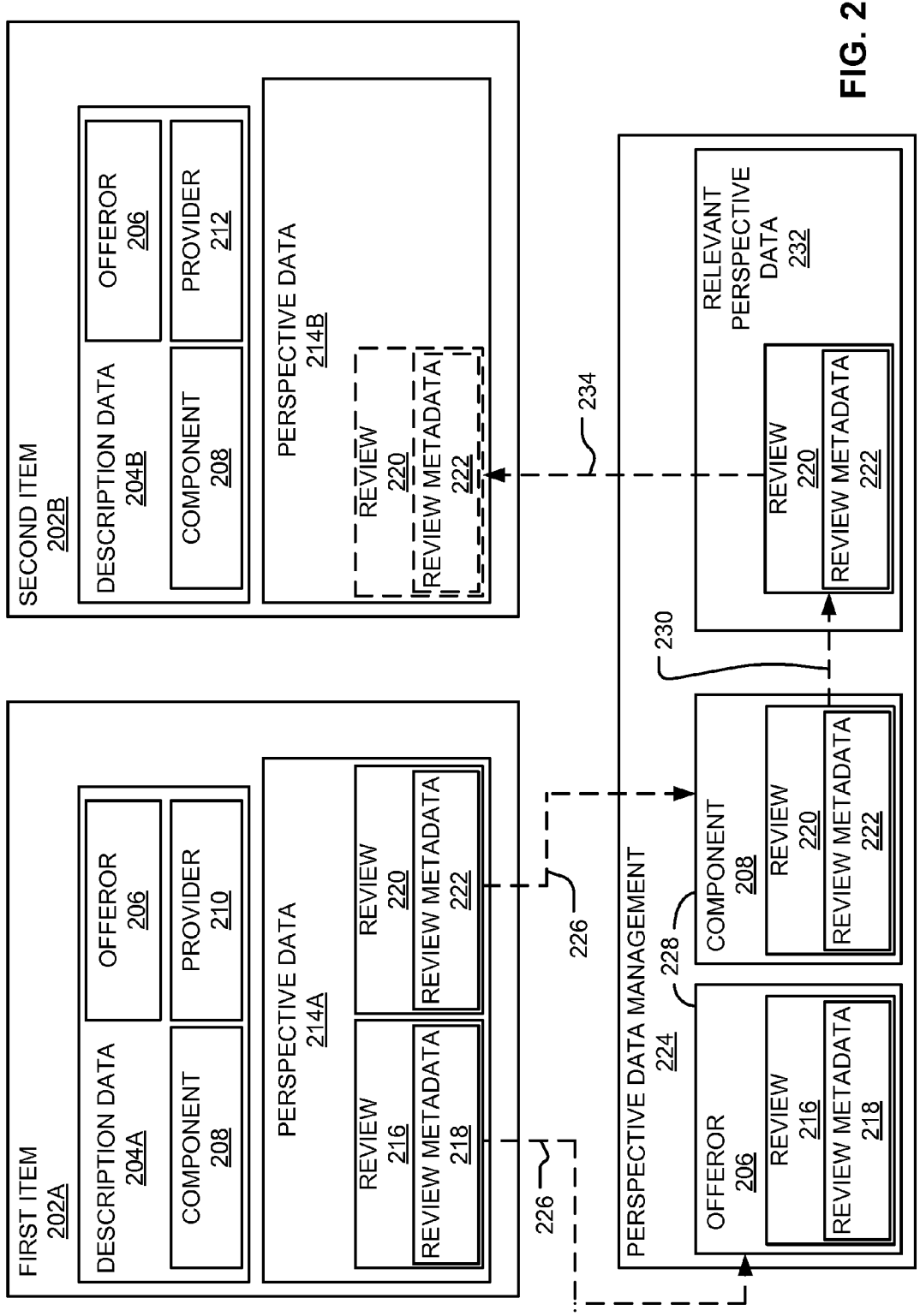
FIG. 2 depicts a diagram of perspective data management for a first item and second item, according to embodiments of the present disclosure.

Referring now to FIG. 2, a diagram of perspective data management 224 for a first item 202A and second item 202B can be seen according to embodiments of the present disclosure. The first item and second item 202A, 202B can each have description data 204A, 204B and perspective data 214A, 214B. For example, the first item 202A and the second item 202B could each be listed on an e-commerce marketplace. As a part of the listing the e-commerce marketplace could have description data 204A and perspective data 214A associated with the first item 202A and description data 204B and perspective data 214B associated with the second item 202B. In certain embodiments, the first item 202A and second item 202B could be listed in other suitable locations.

As seen in FIG. 2, description data 204A, 204B can include data identifying features in the first and second item 202A, 202B. For example, description data 204A can include data identifying a first offeror 206, a first component 208, and a first provider 210 as features of the first item 202A. Description data 204B can include data identifying the first offeror 206, the first component 208, and a second provider 212 as features of the second item 202B.

As described herein, the perspective data 214A, 214B can include text reviews of the items 202A, 202B, a rating parameter, or other information. As shown in FIG. 2, perspective data 214A can include a first review 216 and a second review 220. The first review 216 can include first review metadata 218. The second review 220 can include second review metadata 222. Review metadata 218, 222 can include data about the individual reviews 216, 220. For example, review metadata 218, 222 could include the identity of the reviewer, whether or not other users found the review 216, 220 helpful, whether the review 216, 220 was created by a verified user of the item 202A, 202B, and other metadata. In certain embodiments, metadata regarding the identity of the reviewer can include the number of reviews created by the reviewer, the content of reviews created by the reviewer and other information.

Perspective data management module 224 can be the same or substantially similar as the perspective data management application 113 (FIG. 1). In embodiments, the perspective data management module 224 can identify a common feature in the first item 202A and the second item 202B. The common feature can be the same or substantially similar as described herein. In FIG. 2 for example, the first item 202A and the second item 202B share features of the first offeror 206 and the first component 208. As described herein, the perspective data management module 224 can parse the description data 204A, 204B to identify features in the items 202A, 202B. As described herein, if the items 202A, 202B are associated with concepts (such as model number, item number, etc.) which are the same or substantially similar, then they can be common features. In FIG. 2, the perspective data management module can identify that the common features between the first item 202A and the second item 202B include the offeror 206 and the component 208.

The perspective data management module 224 can establish 226 a subset of perspective data 228 associated with the common features. As described herein, the perspective data management module 224 can parse perspective data 214A for the first item 202A and identify perspective data which is related to the common features. For example, in FIG. 2, the perspective data management module 224 can identify review 216 as being associated with the offeror 206 and review 220 as being associated with components 208. The perspective data management module 224 can establish 226 a subset of perspective data 228 associated with the common features of the offeror 206 and/or the component 208.

The perspective data management module 224 can determine a relevancy score for perspective data in the subset of perspective data 228. For example, the perspective data module 224 can determine a relevancy score for the first review 216 and a relevancy score for the second review 220. In embodiments, the relevancy score can be determined based on perspective data metadata. For example, review metadata 218, 222 can be used to determine relevancy scores for the first review 216 and the second review 220. For example, the second review 220 could have metadata 222 indicating that the review was made by a verified user of item 202A and that the person who made the first review 216 had a plurality of other reviews for various items. This metadata could indicate that the second review 220 was relatively trustworthy. Thus, the perspective data management module 224 could generate a relatively high score for the second review 220. In certain examples, the first review 216 could have metadata 218 indicating that the review was made by an unverified user of item 202A and that the person who made the first review 216 had no other reviews. The perspective data management module 224 could generate a relatively low score for the first review 216.

If the relevancy score for perspective data is outside of a relevancy threshold, then the perspective data management module 224 can determine that the perspective data is relevant. The perspective data management module 224 can establish 230 a set of relevant perspective data 232 from the subset of perspective data 228. The set of relevant perspective data 232 can be established from perspective data which has a relevancy score outside of the relevancy threshold, as described herein.

If the relevancy score for perspective data is within the relevancy threshold, then the perspective data management module 224 can determine that the perspective data is irrelevant.

The perspective data management module 224 can associate 234 the set of relevant perspective data with the second item 202B. For example the second review 220, after being determined to be associated with a common feature and determined to be relevant, can be associated with the perspective data 214B for the second item 202B. Thus, a user seeing information regarding the second item 202B will be presented with perspective data 214B having the second review 220. Thus, the second item 202B has incorporated perspective data from the first item 202A to increase the sample size of perspective data 214B, as described herein.

Figure 3:
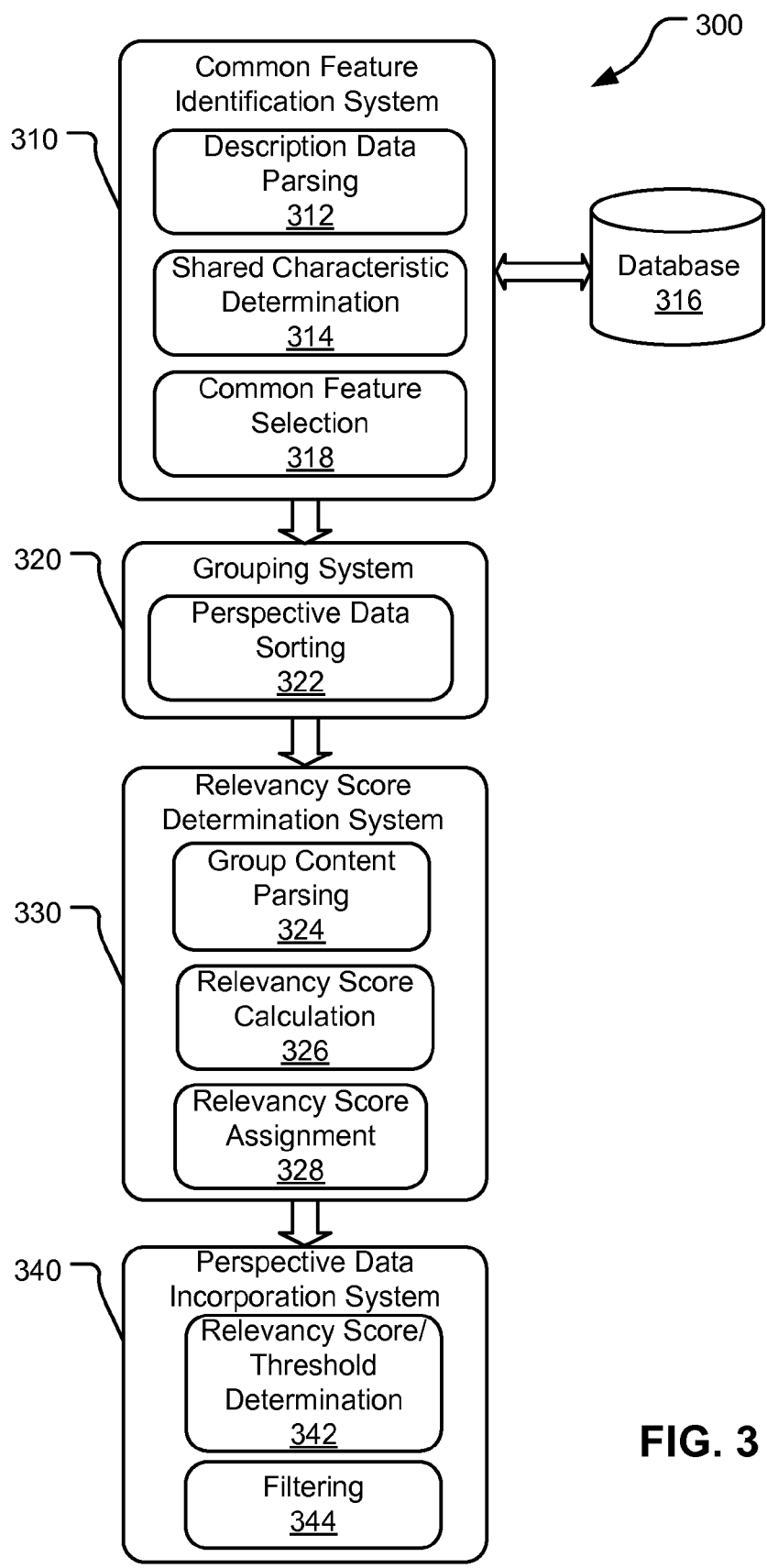
FIG. 3 depicts a system architecture for perspective data management, according to embodiments of the present disclosure.

Referring now to FIG. 3, a system architecture 300 for perspective data management can be seen according to embodiments of the present disclosure. As shown in FIG. 3, in certain embodiments, the system architecture 300 can include a common feature identification system 310. The common feature identification system 310 can include a description data parsing module 312, a shared characteristic determination module 314, a database 316, and a common feature selection module 318.

The description data parsing module 312 can be configured to use natural language processing techniques to analyze semantic and syntactic content of a set of description data. The set of description data can be stored in a database 316 accessible to the common feature identification system 310. In response to parsing the set of description data, the shared characteristic determination module 314 can be configured to determine a set of shared characteristics in the set of description data. The common feature selection module 318 can be configured to select a first shared characteristic as the common feature.

As described herein, in certain embodiments, the natural language processing techniques can be configured to identify features in of the set of description data and determine whether features are the same or substantially similar. In embodiments, features can be identified by parsing a semistructure product specification. In certain embodiments, features can be identified by processing unstructured description data looking for high-IDF (inverse document frequency) terms and/or concepts of particular merit from a known ontology of terms associated with features. Accordingly, in certain embodiments, the common feature can be determined based on the characteristics in the set of description data.

In embodiments, the system architecture 300 can include a grouping system 320. The grouping system 320 can include a perspective data sorting module 322. The grouping system 320 can be configured to group perspective data from a set of perspective data into a subset of perspective data based on the common feature. As described herein, the grouping system can sort perspective data which is associated with the common feature into the subset of perspective data.

In embodiments, the system architecture 300 can include a relevancy score determination system 330. The relevancy score determination system 330 can include a group content parsing module 324, a relevancy score calculation module 326, and a relevancy score assignment module 328. The group content parsing module 324 can be configured to parse, using the natural language processing technique, semantic and syntactic content of the subset of perspective data. Based on semantic content, syntactic content, and metadata for the subset of perspective data, the relevancy score calculation module 326 can be configured to calculate a set of relevancy scores for perspective data in the subset. In response to calculating the set of relevancy scores, the relevancy score assignment module 328 can assign the relevancy scores to the perspective data.

In embodiments, the system architecture 300 can include a perspective data incorporation system 340. The review establishing system 340 can include a relevancy score/threshold determination module 342, and a filtering module 344.

The relevancy score/threshold determination module 342 can be configured to determine whether relevancy scores for the subset of perspective data is outside of a relevancy threshold. Accordingly, the filtering module 344 can be configured to filter the out perspective data which has a relevancy score within the relevancy threshold in order to establish a set of relevant perspective data.

Figure 4:
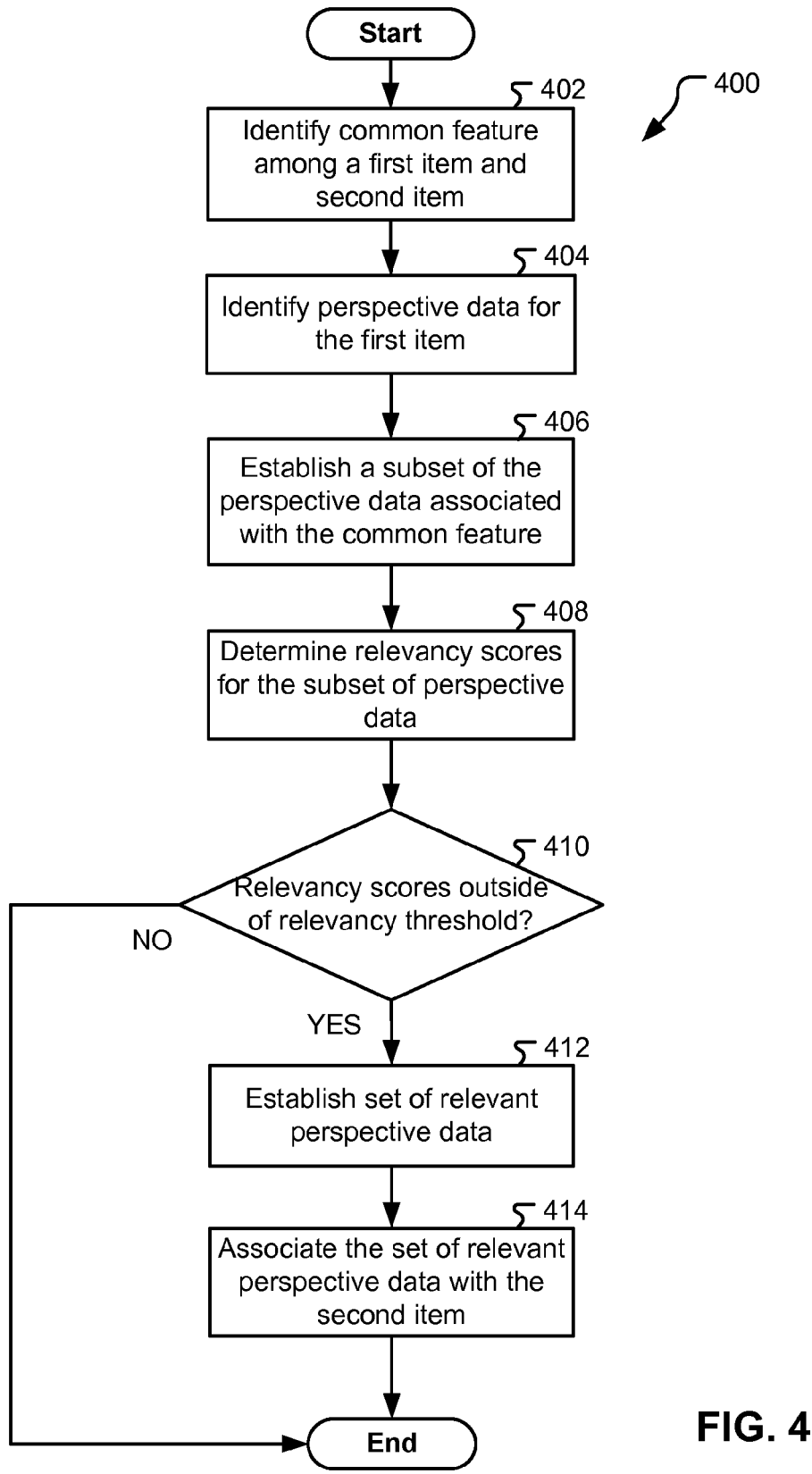
FIG. 4 depicts a flowchart diagram of a method of perspective data management, according to embodiments of the present disclosure.

Referring now to FIG. 4 a flowchart diagram of a method 400 can be seen according to embodiments of the present disclosure. In operation 402, a system can identify a common feature among a first item and a second item. The first item and second item can be the same or substantially similar as described herein. The common feature can be the same or substantially similar as described herein. In embodiments, the common feature is a feature in the first item and the second item which are the same. In certain embodiments, the common feature is a feature in the first and second item which are substantially similar.

In operation 404, the system can identify a set of perspective data associated with the first item. The set of perspective data can be the same or substantially similar as described herein. In embodiments, the set of perspective data can include text reviews and rating parameters.

In operation 406, the system can establish a subset of the perspective data that is associated with the common feature. As described herein, a system of perspective data management can parse description data associated with the first and second items to identify one or more common features between the items. In operation 408, the system can determine relevancy scores for the subset of perspective data. In embodiments, the relevancy scores can be determined based on metadata associated with the perspective data as described herein.

If relevancy scores are outside of a relevancy threshold then, in decision block 410, the method can progress to operation 412. In operation 412, the system can establish a set of relevant perspective data. If relevancy scores are not outside of the relevancy threshold then, in decision block 410, the method 400 can terminate as none of the perspective data has a relevancy score sufficient to be incorporated between the first and second items. In operation 414, the system can associate the set of relevant perspective data with the second item.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of managing perspective data associated with a common feature in items, the method comprising:
   identifying, by a processor and via a scan of stored data, a common feature in a first item and a second item, the first item having a set of perspective data, the common feature relating a component of the first item with a component of the second item, and wherein the identifying includes:
       parsing, using a natural language processing technique configured to analyze semantic and syntactic content, a set of description data associated with the first and second items;
       determining, in response to parsing the set of description data, a set of shared characteristics in the set of description data; and
       selecting, from the set of shared characteristics, at least one feature as the common feature;
   establishing a subset of perspective data associated with the common feature; and
   associating the subset of perspective data with the second item.

2. The method of claim 1, further comprising:
   determining a set of relevancy scores for the subset of perspective data associated with the common feature;
   establishing a set of relevant perspective data from the subset of perspective data, the set of relevant perspective data having relevancy scores outside of a relevancy threshold; and
   associating the set of relevant perspective data with the second item.

3. The method of claim 2, wherein:
   determining the set of relevancy scores for the subset of perspective data further includes:
       parsing, using a natural language processing technique configured to analyze semantic and syntactic content, the subset of perspective data;
       calculating, based on syntactic content, semantic content, and metadata for the subset of perspective data, the set of relevancy scores; and
       assigning the set of relevancy scores to the subset of perspective data.

4. The method of claim 1, wherein:
   determining a set of shared characteristics in the set of description data further includes:
       determining, based on semantic information analyzed by the natural language processing technique, that the first item and second item have at least one characteristic which is substantially similar; and including the at least one characteristic which is substantially similar in the set of shared characteristics.

5. The method of claim 4, wherein:

determining, based on semantic information analyzed by the natural language processing technique, that the first item and second item have at least one characteristic which is substantially similar includes:

mapping a first feature from the first item to a first concept;

mapping a second feature from the second item to a second concept;

determining whether the first concept and second concept are substantially similar; and determining that the first item and second item have at least one characteristic which is substantially similar in response to determining that the first concept and second concept are substantially similar.

6. The method of claim 5, wherein:

determining whether the first concept and second concept are substantially similar includes:

determining whether the first concept and second concept are the same; and determining that the first concept and second concept are substantially similar in response to determining that the first concept and second concept are the same.

* * * * *